(12) United States Patent
Vehmas et al.

(10) Patent No.: US 6,786,065 B2
(45) Date of Patent: Sep. 7, 2004

(54) METHOD AND APPARATUS FOR BENDING GLASS

(75) Inventors: Jukka Vehmas, Tampere (FI); Juha Paavola, Tampere (FI); Antti-Jussi Numminen, Tampere (FI)

(73) Assignee: Uniglass Engineering Oy, Tampere (FI)

( * ) Notice: Subject to any disclaimer, the term of this patent is extended or adjusted under 35 U.S.C. 154(b) by 331 days.

(21) Appl. No.: 10/131,781

(22) Filed: Apr. 23, 2002

(65) Prior Publication Data
US 2002/0152769 A1 Oct. 24, 2002

Related U.S. Application Data

(63) Continuation of application No. PCT/FI00/00944, filed on Oct. 31, 2000.

(30) Foreign Application Priority Data

Nov. 1, 1999 (FI) .............................................. 19992357

(51) Int. Cl.[7] ........................................... C03B 23/025
(52) U.S. Cl. ............................. 65/107; 65/104; 65/290; 65/273; 65/291
(58) Field of Search ......................... 65/102, 104, 107, 65/163, 273, 289, 290, 291

(56) References Cited

U.S. PATENT DOCUMENTS

| 4,575,389 A | | 3/1986 | Halberschmidt et al. ...... 65/273 |
|---|---|---|---|
| 4,778,506 A | * | 10/1988 | Petitcollin et al. ............ 65/106 |
| 4,778,508 A | | 10/1988 | Petitcollin et al. ............ 65/107 |
| 4,909,819 A | * | 3/1990 | McMaster et al. ............ 65/104 |
| 4,918,946 A | * | 4/1990 | Vanaschen et al. ........... 65/104 |
| 4,957,531 A | * | 9/1990 | McMaster et al. ............ 65/273 |
| 4,976,762 A | * | 12/1990 | Anttonen ..................... 65/107 |
| 5,059,233 A | | 10/1991 | Miihkinen et al. ............ 65/104 |
| 5,974,833 A | * | 11/1999 | Vaha-Antila et al. ......... 65/102 |

FOREIGN PATENT DOCUMENTS

| EP | 0261611 | 3/1988 |
|---|---|---|
| FI | 89902 | 4/1989 |
| FI | 90043 | 1/1990 |
| FI | 80872 | 3/1990 |
| FI | 92816 | 9/1994 |
| WO | 9511202 | 4/1995 |

\* cited by examiner

*Primary Examiner*—Steven P. Griffin
*Assistant Examiner*—Carlos Lopez
(74) *Attorney, Agent, or Firm*—Ladas & Parry

(57) ABSTRACT

A method of bending glass, in which glass (5) is heated in a bending furnace (1). Before the bending, the glass (5) is transferred from the heating point or zone onto a mould (7) located thereafter. While the glass (5) is being transferred onto the mould (7), the mould (7) moves in such a way that the horizontal velocity of at least the front edge of the mould (7) is substantially as high as the horizontal velocity of the glass (5).

21 Claims, 2 Drawing Sheets

METHOD AND APPARATUS FOR BENDING GLASS

This application is a continuation of PCT/FI00/00944, filed on Oct. 31, 2000.

The invention relates to a method of bending glass, in which method glass is heated in a bending furnace, and the glass is transferred onto a movable mould after its heating point or zone, whereby the glass bends upon the mould, and when the glass is being transferred onto the mould, the mould is moved in such a way that the horizontal velocity of at least the front edge of the mould is arranged to be substantially as high as the horizontal velocity of the glass.

Further, the invention relates to an apparatus for bending glass which apparatus comprises a bending furnace comprising heating means for heating glass; a mould for bending glass; means for transferring glass onto a mould, whereby the mould is arranged to be moved into a position following the heating point or zone of the glass; and a control unit for guiding the movements of the mould and the glass in such a way that when the glass is being transferred onto the mould, the horizontal velocity of at least the front edge of the mould is arranged to be substantially as high as the horizontal velocity of the glass.

Basically, two kinds of solutions have been suggested for bending glass, i.e. the glass is bent either inside or outside a bending furnace. Bending glass outside a bending furnace is disclosed in WO publication 95/11202 and FI publications 891646 and 863826, for example. Glass is typically heated in conventional roller furnaces. The actual bending takes place outside the furnace, usually either gravitationally or by pressing the glass against a desired form surface. When the glass is bent outside the furnace, the problem is that the glass cools during the bending. The surfaces of the glass naturally cool faster than the inside of the glass. Thus, the problem is that the bending resistance of the glass increases greatly, and in addition, the temperature of the glass will fall below the tempering temperature if the glass is taken out of the furnace only slightly warmer than the tempering temperature. Bending outside the furnace always requires additional heating of the glass into a temperature exceeding the normal tempering temperature. Overheating of the glass always leads to great quality problems in the glass, and thus a high quality level cannot be achieved for the glass. Further, as to the bending form, it is very difficult to produce flawless glass.

If glass is bent inside the furnace, a great deal of know-how is required when the glass to be heated is transferred to the bending mould. For instance, difficulties are caused by the fact that the transfer has to take place in a hot state, i.e. the temperature of the furnace has to be approximately 700° C., for example. For example the positioning of the glass into the correct location is difficult in a hot state. Moreover, the upper surface of the glass may in some cases be coated or painted, and thus prone to damage. Further, due to its temperature, the glass is soft, and touching easily leaves traces on it. However, what it comes to optical quality, bending glass inside the furnace allows best possible glass to be produced.

In a method in which the heating and bending of the glass are performed inside the furnace, the glass is heated upon ceramic rollers. After this, the glass is lifted up from the ceramic roller arrangement by means of a vacuum lifter, transferred from the vicinity of the rollers and dropped onto an edge mould brought under the vacuum lifter. The glass is then immediately transferred to temper cooling. Hereby, however, the central area of the glass easily bends too much, in other words an 'overbend' is formed in the glass, which may even be desirable in the manufacture of vehicular glasses. However, the method is hereby not applicable to the manufacture of furniture glasses. Further, vacuum lifters leave marks on the upper surface of the glass to be bent, in particular in the treatment of coated and painted glasses.

FI publications 884443 and 931828 disclose a solution in which the glass is positioned directly upon a bending mould, whereby the glass is heated as from the initial situation in such a way that it is supported by the mould. The large number of moulds and the consequently impaired repeatability accuracy are drawbacks of this solution. Further, the manufacture of the mould itself is a problem, because it is very difficult to produce an optimal mould when the glass is supported by the mould during the entire heating and temper cooling process. Also in this method, the central area of the glass bends too much, in other words an overbend is formed in the glass.

Furthermore, a method is known which utilizes a roll arrangement which bends according to the form of the glass inside the furnace. From the roll arrangement the glass is correspondingly transferred to the roll arrangement of the cooling unit. The method is very complex and expensive, and in addition, the range of potential forms for the glasses to be manufactured is rather limited.

FI publication 82438 discloses a method of transferring glass sheets from a conveyor onto a mould. A small angle is formed between the path of the mould and the path of movement of the glass sheets exiting from the conveyor. When the glass is being transferred onto the mould, the velocity of the mould is substantially as high as the velocity of the glass. However, the transfer of the glass onto the mould is rather clumsy, and because the glass is rather soft at the moment of the transfer, there is a risk that the glass will get damaged.

An object of this invention is to provide a method and an apparatus by means of which a good result is achieved in the bending of glass.

The method according to the invention is characterized in that while glass is being transferred onto a mould, the front edge and the rear edge of the mould are arranged to have different paths of movement.

Further, the apparatus according to the invention is characterized in that while glass is being transferred onto a mould, the front edge and the rear edge of the mould are arranged to have different paths of movement.

An essential idea of the invention is that glass is heated in a furnace and transferred thereafter onto a mould following the heating point or zone in such a way that while the glass is being transferred, the horizontal velocity of the front edge of the mould is substantially as high as the horizontal velocity of the glass, and the front edge and the rear edge of the mould have different paths of movement. The idea of a preferred embodiment is that the glass is bent in a furnace. The idea of a second preferred embodiment is that the glass is heated upon rollers. The idea of a third preferred embodiment is that the front edge of the mould is slightly below the upper surface of the roller arrangement. The idea of a fourth preferred embodiment is that the mould is in an oblique position in such a way that its front edge is higher than the rear edge when the front edge of the glass passes the last roller. The idea of a fifth preferred embodiment is that the rear edge of the mould is arranged at an early stage of the transfer below the roller arrangement. The idea of a sixth preferred embodiment is that the front edge of the glass is supported after the front edge of the glass has passed the last roller, until the front edge of the glass reaches the point where it is supported by the mould. The idea of a seventh preferred embodiment of the invention is that the mould is at at least one point bent substantially in its entirety when the mould is being transferred from the position it had during the initial heating of the glass into a position where the glass is arranged upon the mould.

An advantage of the invention is that good optical quality and a flawless bending form are achieved for the glass. No marks are left on the upper surface of the glass. Further, the mould is simple, and the solution in its entirety is simple and reliable. The invention allows manufacture of bent glass in a flexible manner for different purposes, such as for automotive industry, and also for furniture, shipping and/or building industries. When it is bent inside the furnace, the glass does not have to be heated into a temperature substantially higher than the tempering temperature.

The invention is explained in more detail in the attached drawings, of which

Figure 1:
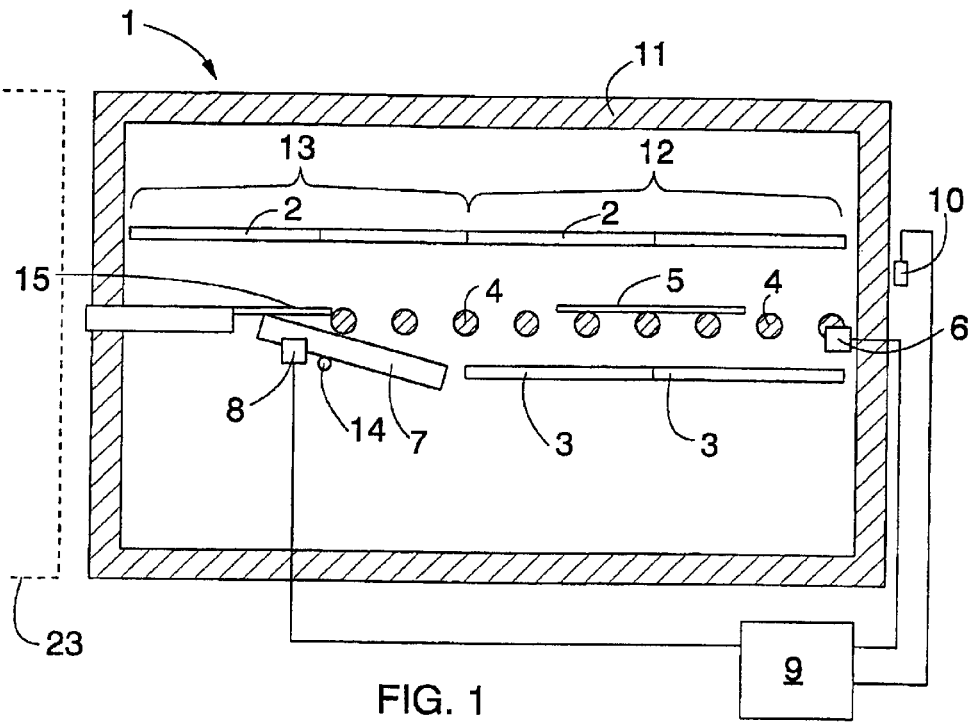
FIG. 1 shows a schematic side view of a cross-section of an apparatus according to the invention.

FIG. 1 illustrates a bending furnace 1. The bending furnace 1 comprises means, for example upper resistors 2, for heating glass 5 in the furnace from above, and means, for example lower resistors 3, for heating the glass 5 in the furnace from below. While in the bending furnace 1, the glass 5 is supported by rollers 4, for example ceramic rollers. Roller drive 6 shown schematically can be arranged as desired in such a manner that the bending furnace is for example oscillating, half-oscillating or continuous. The bending furnace 1 further comprises a mould 7, whereby the heated glass 5 is led from the rollers 4 onto the mould 7, so that the glass 5 bends upon the mould 7.

The mould 7 is made movable in such a way that its movement is controlled by mould drive 8. The mould drive may be chain drive or gear drive, for example, or it can be implemented by utilizing a robot outside the furnace. The roller drive 6 and the mould drive 8 are controlled by a control unit 9. Thus, both the roller drive 6 and the mould drive 8 can be implemented in any manner known by a person skilled in the art, and by means of the control unit 9, the roller drive 6 and the mould drive 8 can be controlled in such a way that desired and sufficiently accurate movement is achieved for the glass 5 and the mould 7. The apparatus further comprises a sensor 10, which allows determination of the position of the glass 5 fed into the bending furnace 1 from the right side in FIG. 1. On the basis of the information contained in the sensor 10 and the roller drive 6, the control unit 9 detects at each particular moment in which part of the furnace the glass 5 is located. Furthermore, the roller drive 6 is implemented in such a way that the movements can be implemented accurately and steplessly.

Figure 4:
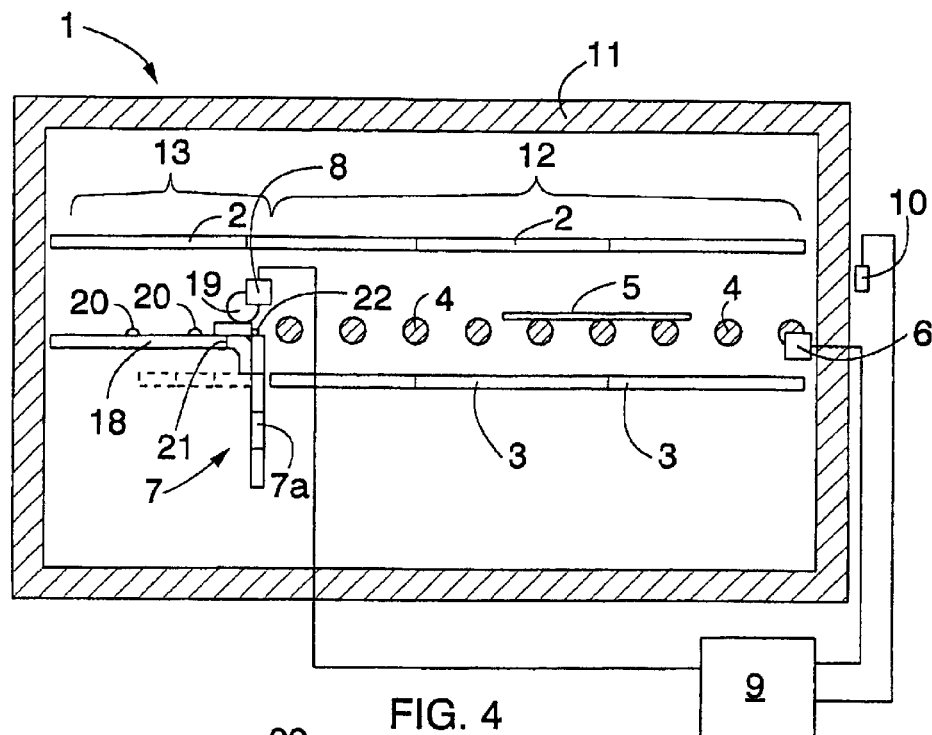
FIG. 4 shows a schematic side view of a cross-section of another apparatus according to the invention.

FIGS. 1 and 4 schematically illustrate frame 11 of the bending furnace 1 without showing openings through which the glass 5 is led into the bending furnace 1 or, on the other hand, openings through which the glass 5 is led out of the bending furnace 1, for instance. The frame 11 has very good insulators, so that the heat inside the bending furnace 1 does not escape out of the furnace. Further, FIG. 1 does not show a conveyor positioned on the right side of the bending furnace 1, by means of which the glass 5 is brought into the bending furnace. Part of a tempering unit 23 on the left side of the bending furnace 1 is indicated by broken lines in FIG. 1. The basic structure of the bending furnace 1 and the basic solutions related to the bending furnace 1 are as such fully known by those skilled in the art and are therefore not described in greater detail herein.

The glass 5 is brought into the furnace in such a way that first the glass 5 is brought into a heating section 12. The heating section 12 comprises upper resistors 2 above the rollers 4 and lower resistors 3 below the rollers 4, whereby the glass 5 is heated in the heating section 12 both from above and from below. As soon as the glass 5 has been heated sufficiently warm, it is transferred to a bending section 13. There are rollers 4 at the front end of the bending section, and upper resistors 2 are arranged over the whole area of the bending section 13. By contrast, the bending section 13 has no lower resistors 3. The whole area provided with rollers 4 may, however, be regarded as the heating point or zone of the glass 5.

In the bending section 13, the glass 5 is moved forwards at an even speed. After the front end of the bending section 13, there are no more rollers 4, and after the rollers 4, the mould 7 is arranged in an oblique position. The angle of the mould 7 is at this stage typically about 15°. The rear end of the mould 7 is arranged below the rollers 4, and the front end is, for example, about 300 mm ahead of the central point of the last roller. The front end of the mould 7 is arranged about 25 mm below the upper part of the rollers 4. Thus, if the diameter of a roller 4 is about 75 mm, and the distance between the mould 7 and the last roller 4 is 25 mm, as mentioned, the mould 7 is at an angle of about 14° relative to the horizontal plane.

Figure 2A:
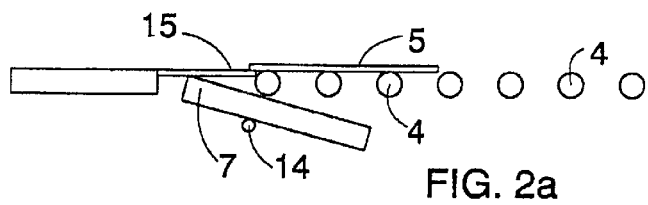
FIGS. 2a, 2b and 2c show a schematic side view of transfer of glass from rollers onto a mould, using the apparatus according to FIG. 1.
Figure 2B:
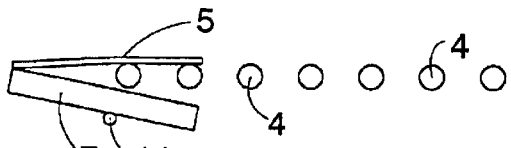
Figure 2C:
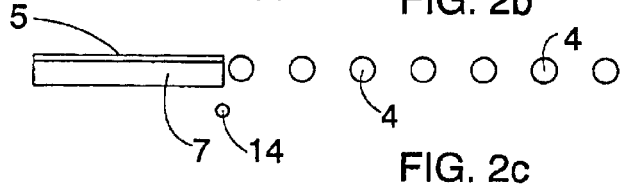

The glass 5 is transferred slowly and smoothly forwards from the position shown in FIG. 2a. As soon as the front edge of the glass 5 reaches the front edge of the mould 7, the mould 7 begins to move forwards at an exactly the same speed as the glass 5, as illustrated in FIG. 2b. The movements and the velocities of the glass 5 and the mould 7 are thus synchronized. The front edge of the glass 5 thus contacts the front edge of the mould 7, and the movement of the mould 7 and the glass 5 is continued forwards, until also the rear edge of the glass 5 passes the last roller 4 and also the rear part of the glass 5 drops onto the mould 7, as indicated in FIG. 2c. The glass 5 upon the mould 7 is allowed to bend against the mould 7 in the bending furnace 1, and hereafter the glass 5 is transferred from the bending furnace 1 to tempering upon the mould 7.

When the glass 5 is being transferred onto the mould 7, the front edge of the mould 7 moves substantially horizontally. The mould 7 is supported upon a supporting point 14, whereby the rear edge of the mould moves not only forwards but also upwards. Hence, the front and rear edges of the mould 7 have different paths of movement, whereby the glass 5 can be transferred onto the mould 7 in a very smooth manner. The front edge of the mould 7 is arranged below the upper level of the rollers 4, whereby the glass 5 may bend slightly downwards after the last roller 4 prior to contacting the front edge of the mould 7.

Particularly when bending small and/or thin glasses 5, an auxiliary support 15 may be utilized when the glass 5 is transferred onto the mould 7. At its simplest, the auxiliary support 15 is a thin rod, which is used from outside the furnace and which moves at the speed of the front edge of the glass 5, supporting the glass 5 until the front edge of the glass 5 reaches the point where it is supported by the front edge of the mould 7. When the glass 5 reaches the mould 7 and is placed to be supported by the mould 7, the auxiliary support 15 is moved downwards away from the glass 5 and pulled further out of the furnace. This kind of solution is feasible in such a case where the glass is bent downwards from the centre, seen from the direction of travel, whereby there is still an empty space at the central point of the glass 5 between the mould 7 and the glass 5 at the stage when the glass 5 is not totally bent against the mould 7. This kind of solution allows, in particular, transfer of small glasses 5 from the rollers 4 onto the mould, and it also facilitates, in particular, transfer of thin glasses 5 onto the mould 7 in such cases where the glass 5 would otherwise tend to bend too much downwards after the last roller 4 due to the high temperature of the glass 5.

Figure 3:
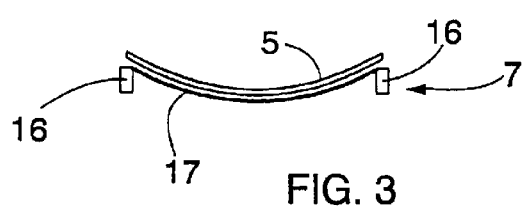
FIG. 3 shows a schematic front view of a mould used in the apparatus of FIG. 1.

FIG. 3 shows a front view of the mould 7. The mould 7 can be what is called an edge mould, whereby the glass 5 contacts the mould only in the edge areas 16. Hereby, bending of the central area of the glass 5 is controlled by means of a precise heating profile combined with a precise bending time. A mould 7 having a partial supporting surface may also be used, whereby the mould 7 is provided with central supports 17, i.e. there are parts supporting the glass 5 also at the central area of the glass 5. The structure of a central support 17 corresponds to the structure of the edge area 16, but now the mould structure is according to the final form of the glass 5.

FIG. 4 shows a bending furnace 1, the basic solution of which corresponds to the solution according to FIG. 1, i.e. while the glass 5 is being transferred onto the mould 7, the horizontal velocity of the front edge of the glass 5 and the horizontal velocity of the mould 7 are arranged substantially equal. However, in the case illustrated by FIG. 4, the mould 7 is at at least one point bendable substantially in its entirety when the mould 7 is being transferred from the position it had during the initial heating of the glass 5 into a position where the glass 5 is arranged upon the mould 7. The bending line of the mould 7 is substantially perpendicular to the direction of movement of the glass 5. The mould 7 is formed for example of several different pieces, i.e. mould parts 7a, connected to each other by joints or pivots 22, whereby the surface of the mould 7 supporting the glass is led in a chain-track-like manner to support the glass 5. Since the mould 7 is bendable, there may be upper resistors 2 above all rollers 4 and lower resistors 3 below all rollers 4. Thus, the bending section 13 provided only with upper resistors 2, may be set up in the bending furnace 1, in the section after the rollers 4, whereby the part of the bending furnace provided with rollers 4 can in its entirety function as the heating section 12. On the other hand, if desired, lower resistors 3 or other means, such as blowing means, may be arranged in the bending furnace 13for heating the glass 5 from below.

In the solution according to FIG. 1, there may be rather a long distance between the last roller 4 and the point where the front edge of the glass sheet 5 reaches the point where it is supported by the front edge of the mould 7. The distance may be made shorter by for instance arranging the mould 7 at an angle more acute than in FIG. 1, but if the mould 7 is long, as for example in furniture applications, in which it is typically about 2,000 mm or even longer, the rollers 4 have to be positioned at rather a high level, whereby the total height of the bending furnace 1 will be too high. One solution is to transfer the glass from the rollers 4 somewhat colder than in a normal situation, whereby the glass 5 is still rather stiff and there is no risk that its front part will flop down. Thus, however, the capacity of the bending furnace decreases, whereby the glass 5 would have to be heated more while it is supported by the mould 7. This, however, would take time and decrease the capacity of the furnace.

Figure 5A:
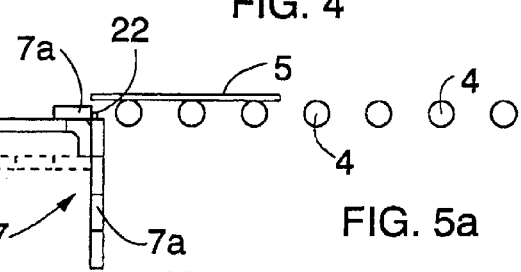
FIGS. 5a, 5b and 5c show a schematic side view of transfer of glass from rollers onto a mould, using the apparatus according to FIG. 4.
Figure 5B:
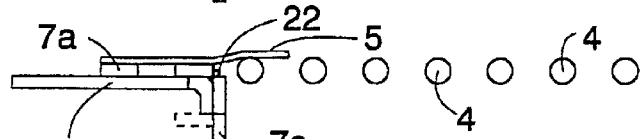
Figure 5C:
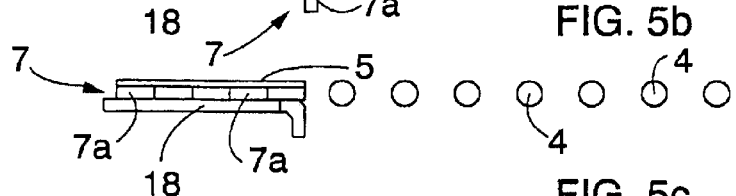

The front part of the mould 7 may be arranged to receive the front edge of the glass 5 as shown in FIG. 5a. Hence, the mould 7 is first mainly in an upright position. On the other hand, the first part 7a of the mould, the length of which is about 250 mm, may be arranged approximately 25 mm below the upper level of the rollers 4, and the rest of the mould 7 may be arranged in such a way that it is bent downwards from the first pivotal point 22. The mould 7 can also be bent in the way indicated by broken lines in FIGS. 4, 5a and 5b, i.e. in such a way that in a situation illustrated in FIG. 5b, for example, the end part of the mould 7 is below the front part. Hence, the mould 7 does not increase the height of the furnace 1. The glass 5 is moved forwards slowly and smoothly, and when the front edge of the glass 5 reaches the front edge of the mould 7, the mould 7 begins to move forwards at exactly the same speed as the glass 5. While the glass 5 and the mould 7 move forwards, the next pivoted part 7a of the mould always rises to the level of the preceding part 7a of the mould, as shown in FIG. 5b. The mould 7 and the glass 5 continue their movement forwards, and the rest of the pivoted parts 7a of the mould also rise substantially to the level of the upper surface of the rollers 4, until the rear edge of the glass 5 travels over the last roller 4 and the rear part of the glass also falls onto the mould 7, as shown in FIG. 5c. After this, the glass 5 is allowed to bend against the mould 7 in the bending furnace 1, and the glass 5 is transferred to tempering upon the mould 7.

The mould 7 is arranged to move upon a guide 18. The mould 7 can be moved upon the guide 18 for example by means of a gear 19 positioned above the mould 7. For example small wheels 20, which rotate freely, may be arranged above the guide 18. On the other hand, there may also be a smooth sliding surface between the mould 7 and the guide 18, whereby the mould 7 easily glides upon the guide 18. The guide 18 may also be provided with a disconnecting point 21, whereby the horizontal part of the guide 18 can be pulled out from the outside of the bending furnace 1, and the mould 7 and the glass 5 upon it can be pulled to temper cooling upon the horizontal part of the guide 18. The guide 18 is so rigid that when the pivoted mould 7 is supported upon the guide 18, the surface of the mould 7 contacting the glass 5 is also straight.

Figure 6:
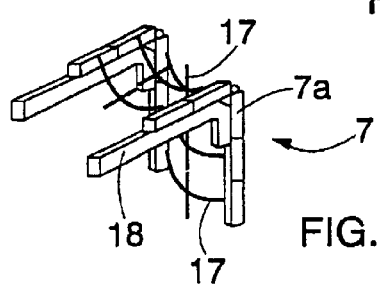
FIG. 6 shows a schematic perspective view of a mould used in the apparatus of FIG. 4.

The mould 7 used may be what is known as an edge mould, contacting the glass 5 only at the edge parts, whereby the bending of the central area of the glass 5 is controlled by a precise heating profile connected with a precise bending time. Control of a precise heating profile and a precise bending time prevents excessive bending of the central area of the glass, in other words formation of an overbend. The mould 7 may also have a partial supporting surface, whereby also the central area of the glass 5 is provided with central supports 17 supporting the glass 5, as shown in FIG. 6. By means of the central supports 17 formation of an overbend can be prevented very efficiently. The pivots 22 are required for the edge parts only, whereby the central supports 17 may be separate pieces. Otherwise, the structure of the central supports 17 may be similar to the structure of the edge part. Hereby, however, the mould structure is according to the final form of the glass also at the central area of the glass 5.

The mould 7 does not have to be formed by parts connected to each other by pivots, but the longitudinal parts of the edge parts and also the longitudinal parts of the central supports 17 may be formed by one part in such a way that they are bendable and allow thus bending of the mould 7. The longitudinal parts may be for example a fibrous rope, such as a cord made of corrosion-resisting steel fibre. At the central supports 17, the longitudinal cord may be loose when the mould is bent, whereby the straightening of the mould 7 tightens the cords rigid, so that being tightened, the cords support the glass 5. Thus, no actual coating needs to be attached between the glass 5 and the mould 7, but the cord itself may be such that the marks it leaves on the glass 5 are minimal and that the cord does not impair the temper cooling.

The drawings and the related description are only intended to illustrate the idea of the invention. The details of the invention may vary within the scope of the claims. Thus, the mould 7 may also be arranged outside the bending furnace 1, whereby the glass 5 is bent outside the bending furnace 1. Hereby, too, the bending takes place in a very isolated space. Most preferably, however, the bending is carried out in the bending furnace 1.

What is claimed is:

1. A method of bending glass, in which method
   glass is heated in a bending furnace,
   the glass is transferred onto a movable mould,
   when the glass is being transferred onto the mould, the mould is moved in such a way that the horizontal velocity of at least the front edge of the mould is substantially as high as the horizontal velocity of the glass,
   while the glass is being transferred onto the mould, the front and rear edges of the mould have different paths of movement and
   the glass bends upon the mould.

2. A method according to claim 1, wherein the bending furnace comprises rollers, whereby the glass is heated in the bending furnace upon the rollers.

3. A method according to claim 2, comprising transferring the glass onto the mould by means of the rollers.

4. A method according to claim 1, comprising arranging the front edge of the mould slightly below a heating point or zone of the glass.

5. A method according to claim 1, comprising arranging the mould in an oblique position in such a way that the front edge of the mould is higher than the rear edge when the front edge of the glass passes an end edge of a heating point or zone of the glass.

6. A method according to claim 1, comprising arranging the rear edge of the mould at an early stage of the transfer of the glass below a heating point or zone of the glass.

7. A method according to claim 1, comprising supporting the front edge of the glass by means of an auxiliary support after the front edge of the glass has passed an end edge of a heating point or zone, until the front edge of the glass reaches a point where it is supported by the mould.

8. A method according to claim 1, comprising bending the mould substantially in its entirety at at least one point when the mould is transferred from a position it had during an initial heating of the glass into a position where the glass is arranged upon the mould.

9. A method according to claim 1, comprising bending the glass upon the mould in the bending furnace.

10. A method according to claim 1, comprising tempering the glass after the bending.

11. An apparatus for bending glass, which apparatus comprises a bending furnace comprising heating means for heating glass; a mould for bending glass; means for transferring glass onto a mould, whereby the mould is arranged to be moved into a position following a heating point or zone of the glass; and a control unit for guiding the movements of the mould and the glass in such a way that when the glass is being transferred onto the mould, the horizontal velocity of at least the front edge of the mould is arranged to be substantially as high as the horizontal velocity of the glass, and while the glass is being transferred onto the mould, the front and rear edges of the mould are arranged to have different paths of movement.

12. An apparatus according to claim 11, wherein the bending furnace comprises rollers for supporting the glass, whereby the glass is arranged to be heated upon the rollers.

13. An apparatus according to claim 12, wherein the apparatus comprises a roller drive arranged to transfer the glass from the rollers onto the mould.

14. An apparatus according to claim 11, wherein the front edge of the mould is arranged slightly below the heating point or zone of the glass.

15. An apparatus according to claim 11, wherein the mould is arranged in an oblique position in such a way that the front edge of the mould is higher than the rear edge when the front edge of the glass passes the end edge of the heating point or zone.

16. An apparatus according to claim 11, wherein the rear edge of the mould is arranged below rollers at an early stage of the transfer.

17. An apparatus according to claim 11, wherein the apparatus comprises an auxiliary support for supporting the front edge of the glass after the front edge of the glass has passed the end edge of the heating point or zone, until the front edge of the glass reaches the point where it is supported by the mould.

18. An apparatus according to claim 11, wherein the mould is at at least one point bendable in its entirety.

19. An apparatus according to claim 18, wherein the mould comprises at least two mould parts connected to each other with pivots.

20. An apparatus according to claim 11, wherein the mould is arranged inside the bending furnace in such a way that the glass is arranged to be bent in the bending furnace.

21. An apparatus according to claim 11, wherein the apparatus comprises a tempering unit arranged in connection with the bending furnace.

* * * * *